(12) United States Patent
Li et al.

(10) Patent No.: US 6,433,973 B1
(45) Date of Patent: Aug. 13, 2002

(54) GMR READ SENSORS WITH NON-UNIFORM HEIGHT

(75) Inventors: Shaoping Li, Naperville, IL (US); Charles Dominic Potter, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/557,353

(22) Filed: Apr. 25, 2000

Related U.S. Application Data

(60) Provisional application No. 60/159,754, filed on Oct. 15, 1999.

(51) Int. Cl.[7] .............................................. G11B 5/39
(52) U.S. Cl. .............................. 360/324.11; 360/324.12
(58) Field of Search ........................ 360/324.1, 324.11, 360/324.12, 324.2

(56) References Cited

U.S. PATENT DOCUMENTS

| | | | |
|---|---|---|---|
| 5,764,056 A | | 6/1998 | Mao et al. .................... 324/252 |
| 6,046,891 A | * | 4/2000 | Yoda et al. ............... 360/324.1 |
| 6,108,176 A | * | 8/2000 | Yokoyama ............. 360/324.11 |

OTHER PUBLICATIONS

A. V. Pohm, R. S. Beech, J. M. Anderson, and W. C. Black, IEEE Trans. Magn. 33, p. 2392 (1997).
A.V. Pohm, J.M. Anderson, R.S. Beech, and J.M. Daughton, IEEE Trans. Magn. 34, p. 1486 (1998).
J.M. Anderson and A.V. Pohm, J. Appl. Phys. vol. 85(8), p. 5321 (1999).
Youfeng Zheng and Jian–Gang Zhu, J. Appl. Phys. vol. 81(8), p. 5471 (1997).

* cited by examiner

*Primary Examiner*—Jefferson Evans

(57) ABSTRACT

A magnetoresistive sensor including spin valve sensor layers, an air bearing surface perpendicular to a first edge region common to the spin valve sensor layers, and a non-planar surface perpendicular to a second edge region common to the spin valve sensor layers and opposite the air bearing surface. The invention also features a method for producing a magnetoresistive sensor. The method includes forming a plurality of spin valve sensor layers, wherein an air bearing surface including a plane perpendicular to a first edge region common to the spin valve sensor layers is formed. Furthermore, a non-planar surface including a plane perpendicular to a second edge region common to the spin valve sensor layers, and opposite the air bearing surface is formed.

15 Claims, 4 Drawing Sheets

GMR READ SENSORS WITH NON-UNIFORM HEIGHT

CROSS-REFERENCE TO RELATED APPLICATION(S)

This application claims the benefit of the filing date of U.S. provisional application Ser. No. 60/159,754 entitled "GMR Read Sensors With Non-Uniform Height," which was filed on Oct. 15, 1999.

BACKGROUND

Magnetic sensors utilizing the GMR effect, frequently referred to as "spin valve" sensors, are known in the art. A spin valve sensor is typically a sandwiched structure consisting of two ferromagnetic layers separated by a thin non-magnetic layer. One of the ferromagnetic layers is called the "pinned layer" because it is magnetically pinned or oriented in a fixed and unchanging direction by either an adjacent anti-ferromagnetic layer or some other mechanism, commonly referred to as the "pinning layer," through anti-ferromagnetic exchange coupling. The other ferromagnetic layer is called the "free" or "unpinned" layer because the magnetization is allowed to rotate in response to the presence of external magnetic fields.

FIG. 1 shows the conventional design structures for a horizontal GMR head sensor 100. The Cu layer 102 is sandwiched between the pinning layer 101 and the free layer 103, with the air bearing surface (ABS) 104 on the bottom of FIG. 1. The ABS is the surface closest to the magnetic medium. The height of the layers, D, is uniform across the track direction in this case. In order to obtain optimized performance, the conventional GMR read head design requires that the height, D, of the GMR sandwich element be less than or equal to the decay length, L, of the magnetic flux captured from the magnet recording media. As shown in FIG. 2, L can be expressed as: $L=(Tg\mu/2)^{1/2}$, where T is the total thickness of magnetic layers, $\mu$ is the permeability of those magnetic layers, and g is half gap distance as shown in FIG. 2. In this situation, the overall change in resistance of a GMR element is subject to a non-uniform field or flux from the media. More precisely, the magnetic flux must become zero at the lower end of the GMR strip. The situation is analogous to that of an open-circuited electric transmission line. If GMR heads are shielded and the optimum condition of D<L is satisfied, the maximum average flux in the GMR element is close to $0.5\Phi(0)$ regardless of the actual height, D, since the width of electric current path, H, is approximately equal to the height, $D_{max}$, of GMR element as long as the height is uniform (i.e., $D_{min}=D_{max}$).

SUMMARY

In spin valve sensors, improved performance is measured by increased sensitivity, which is affected by the ability of the sensor to detect magnetoresistive changes in a magnetic medium. As a result, it is desirable to find ways to improve the sensitivity of spin valve sensors. Consequently, spin valve sensors that respond strongly in the presence of electromagnetic fields are desired.

In general, in one aspect, the invention features a magnetoresistive sensor. The sensor includes spin valve sensor layers, an air bearing surface perpendicular to a first edge region common to the spin valve sensor layers, and a non-planar surface perpendicular to a second edge region common to the spin valve sensor layers and opposite the air bearing surface.

In general, in another aspect, the invention features a method for producing a magnetoresistive sensor. This method includes forming spin valve sensor layers, wherein an air bearing surface including a plane perpendicular to a first edge region common to the spin valve sensor layers is formed, and a non-planar surface including a plane perpendicular to a second edge region common to the spin valve sensor layers and opposite the air bearing surface is formed.

Implementations may include one or more of the following features. The non-planar surface can include a substantially concave channel. The non-planar surface can include a substantially plateau region. The plurality of spin valve sensor layers can include a free magnetic layer, a first nonmagnetic layer, a first pinned magnetic layer, a second nonmagnetic layer and a second pinned magnetic layer. The height of the spin valve sensor stack can be less than 0.5 $\mu$m. The air bearing surface can be substantially parallel to a magnetically recorded surface. The non-planar surface can be formed within an electromagnetic active portion of the magnetoresistive sensor. The non-planar surface can be formed in the direction of a magnetic medium's motion.

Implementations may include one or more of the following advantages. The edge pinning effect on magnetic moment rotation in normal GMR sensor may be lessened so that the GMR sensitivity could be further enhanced. Furthermore, the actual thermal energy density generated by the sense current can be smaller than the GMR element with the same width of current path but uniform height. This type of structure design could drastically increase the sensor repeatability.

A 20–30% possible net increase of GMR element sensitivity could be expected with the use of the non-uniform height, compared with the output signal of the present GMR read heads. Furthermore, GMR elements with non-uniform height could exhibit a higher dM/dH ratio. This results in higher sensitivity than the GMR element with the same width of current path but uniform height.

DETAILED DESCRIPTION

The present invention relates to read sensors, which in some implementations may relate to a horizontal read sensor with non-uniform height.

Figure 1:
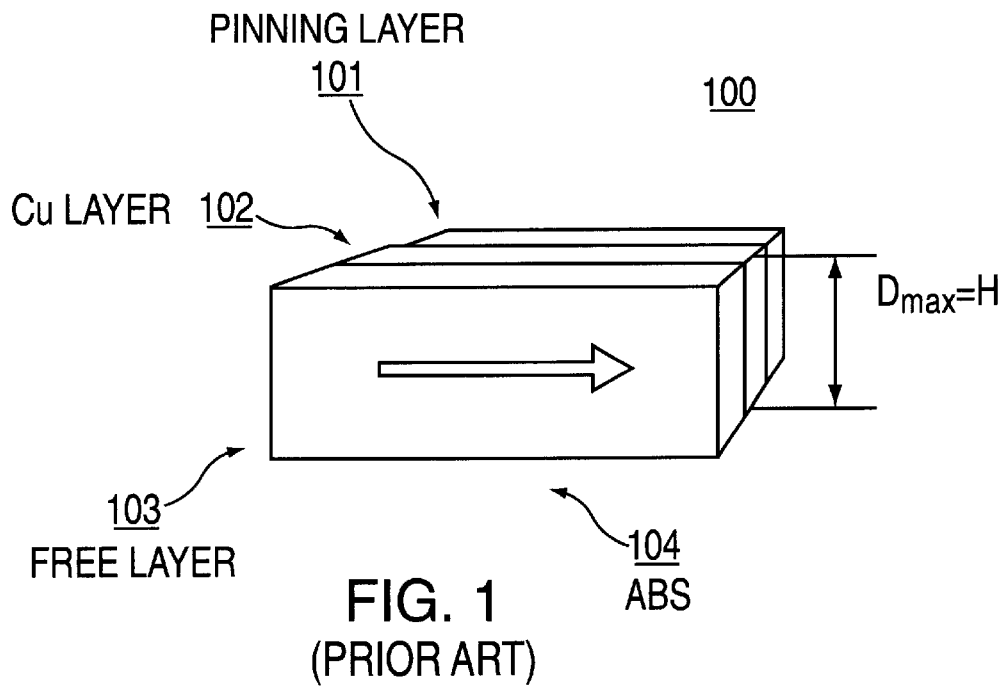
FIG. 1 is a conventional horizontal GMR read sensor with uniform height.
Figure 2:
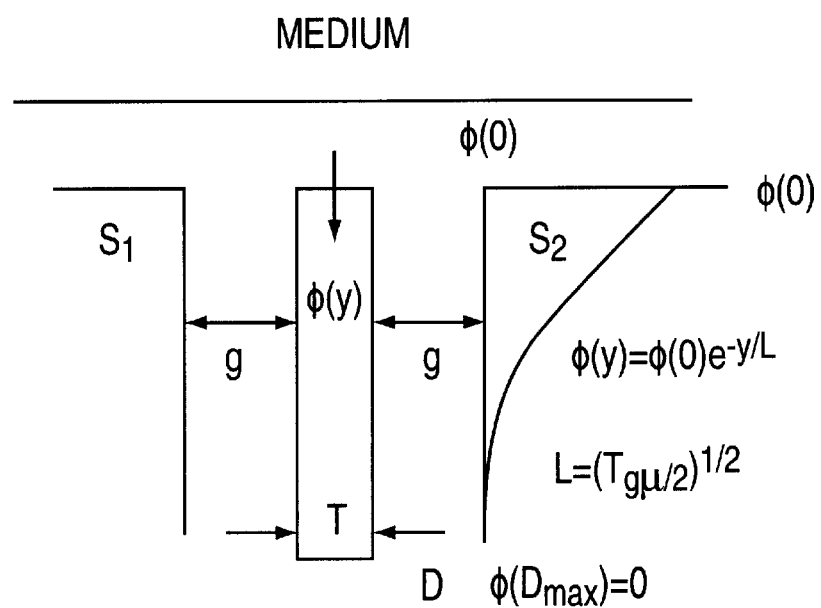
FIG. 2 shows the linear decay of flux with the depth of height for a conventional GMR element with uniform height.
Figure 3:
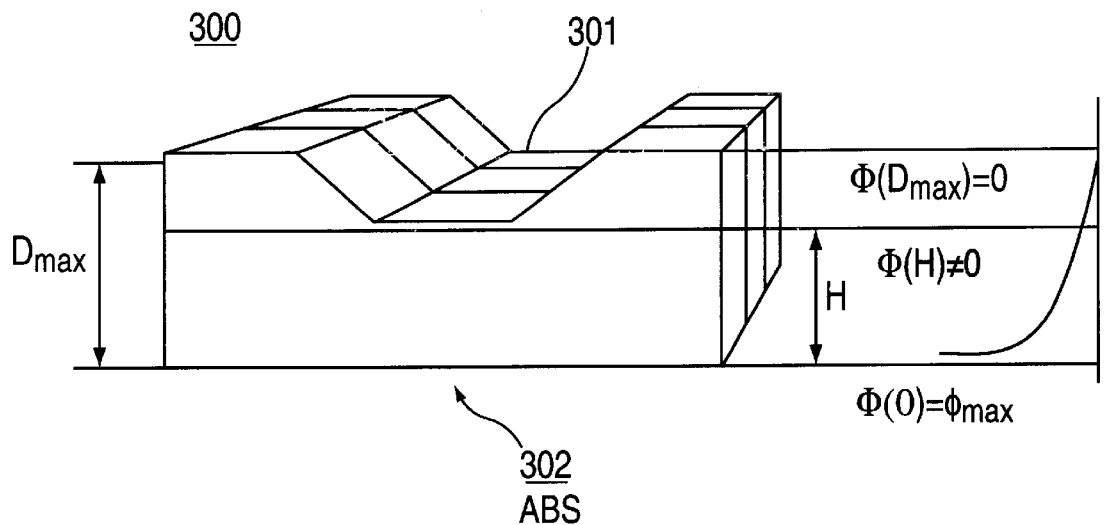
FIG. 3 is a GMR head sensor element with nonuniform height.
Figure 4:
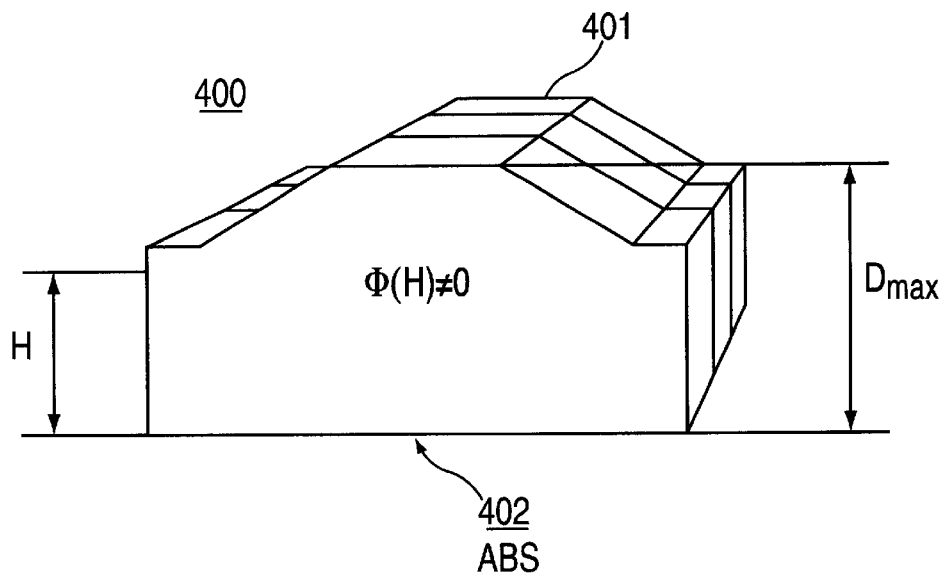
FIG. 4 is a GMR head sensor element with non-uniform height.

FIG. 3 and FIG. 4 illustrate two types of non-uniform GMR stack structures for horizontal GMR read heads. The height of the electric current path, H, is typically less than the maximum height of GMR elements, $D_{max}$, because the GMR element's height is no longer uniform and the electric current essentially follows the smallest resistance path. As is shown in FIG. 3, when the GMR element's height is no longer uniform, the magnetic height, D(x)—i.e., the GMR element's height—will not be equal to the electrical height, H(x). Thus the magnetic flux, Φ, will not be zero at the lower end of the electric path in a certain portion of GMR element, but will typically be equal to zero at the GMR element edge.

The maximum average flux through the electric path of GMR element could be as large as 0.6–0.8 Φ(0), depending upon the exact shape or the non-uniformity of GMR read height since Φ(H)≠0 in many cases. Note that $D_{max}$ might be required to be less than 0.5 μm in order to maintain certain width and height aspect ratio and avoid the Neel wall formation.

FIG. 3 shows one implementation of a non-uniform height sensor element. The sensor 300 consists of a plurality of spin valve sensor layers. The spin valve sensor layers includes an air bearing surface 302 perpendicular to a first edge region common to the plurality of spin valve sensor layers and a non-planar surface 301 perpendicular to a second edge region common to the plurality of spin valve sensor layers and opposite the air bearing surface 302. The non-planar surface 301 is comprised of a substantially concave channel. The height, D, changes over the surface, creating a non-uniform height sensor.

FIG. 4 shows another implementation of a non-uniform height sensor element. The sensor 400 consists of a plurality of spin valve sensor layers. The spin valve sensor layers includes an air bearing surface 402 perpendicular to a first edge region common to the plurality of spin valve sensor layers and a non-planar surface 401 perpendicular to a second edge region common to the plurality of spin valve sensor layers and opposite the air bearing surface 402.

The non-planar surface 401 is comprised of a plateau region. The height, D, changes over the surface, creating a non-uniform height sensor.

A non-uniform height GMR sensor 300 can be produced using any current GMR thin film process, such as conventional semiconductor integration., PVD methods, such as Ion Beam sputtering, DC/RF sputtering, and S-gun. The sputter deposition technique, or other spin valve manufacturing techniques form a layered structure. The spin valve sensors layers are formed, with the air bearing surface (ABS) along the common lower edge of the sensor stack. A non-planar top edge of the sensor stack is formed opposite the ABS. This non-planar edge represents the non-uniform aspect of this invention. The same manufacturing process can be used to form any of the following implementations of the present invention.

In some implementations, FIG. 3 and FIG. 4 can be comprised of a free magnetic layer contacting a first nonmagnetic layer, which is contacting a second planar nonmagnetic layer. The height of these sensor stacks can be less than 0.5 μm. The sensor stack's air bearing surface can also be substantially parallel to a magnetically recorded surface. The non-planar surface can be formed within an electromagnetic active portion of the magnetoresistive sensor. The non-planar surface can be formed in the direction of a magnetic medium's motion.

Figure 6:
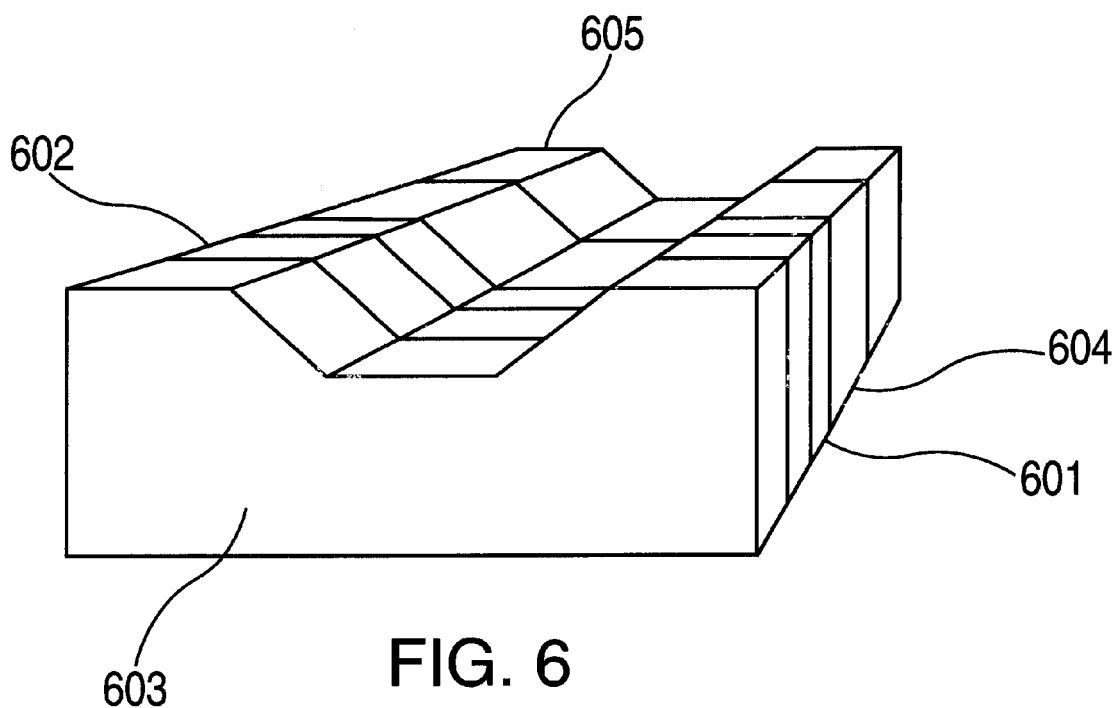
FIG. 6 is a GMR head sensor with a plurality of layers having a non-uniform height.
Figure 7:
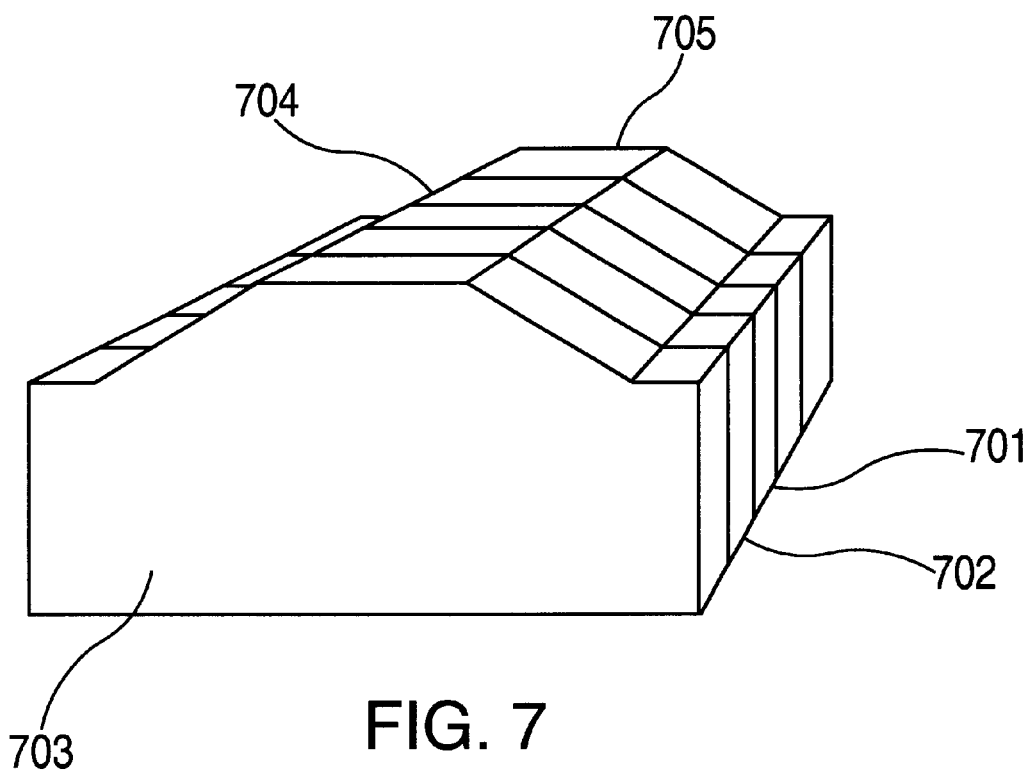
FIG. 7 is a GMR head sensor with a plurality of layers having a non-uniform height.

In some implementations, as shown in FIGS. 6 and 7, the plurality of spin valve sensor layers can include a free magnetic layer 601, 701, a first nonmagnetic layer 602, 702, a first pinned magnetic layer 603, 703, a second nonmagnetic layer 604, 704, and a second pinned magnetic layer 605, 705, respectively. The plurality of spin valve sensor layers may be non-planar surface may include a substantially concave channel or a substantially plateau region.

As the height of GMR element becomes smaller, the coherent rotation process of magnetic moment will become more difficult, leading to a proportional decrease in the sensitivity of the GMR element's height. In the non-uniform height sensor, the maximum height and the minimum height influence the stiffness of coherent rotation simultaneously. The coherent rotation or edge soliton propagation in the low height region and high height region should be strongly coupled to one another since the characteristic exchange length $K_S=(J/2\pi M_S^2)$, where $M_S$ represents the remnant magnetization and J represents the exchange coefficient, is around 0.15 μm for NiFe permalloy. In other words, the coherent rotation process is not solely determined by the smallest height of GMR element, although the resistance of GMR element is mainly determined by the smallest height of GMR element. Therefore, the stiffness for the coherent rotation in GMR elements with non-uniform height should be smaller than that of the GMR element with the same width of current path but uniform height.

Figure 5:
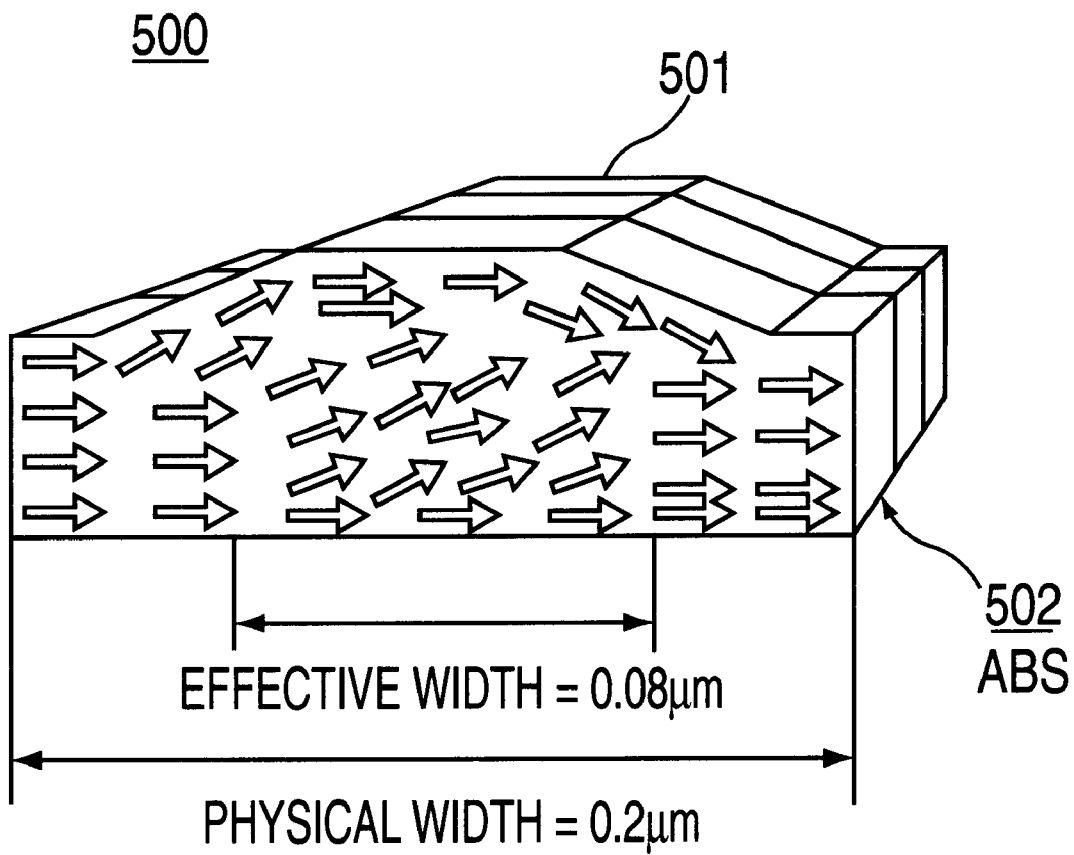
FIG. 5 is a GMR head sensor element with non-uniform height showing sensor width and current flow.

The effective read sensor width in FIG. 4 could be reduced by using the pinning effect induced by the edge shape anisotropy. As the read sensor width is reduced, the track density can be increased. At the recording density of 100Gbits/in$^2$ or above, the read sensor width can be less than 0.1 μm. However, the limit of current lithographic technology is only about 0.13 μm for line width control. Nevertheless, if the sensor structure in FIG. 4 is adopted, the read sensors that have the effective width as small as 0.08 μm or less, and a physical width of 0.2 μm or less, as is shown in FIG. 5, could still be made through current lithographic techniques. In this situation, the real physical width could still be as large as 0.18 μm, but the effective width might be only as small as 0.08 μm or less by using the unique shape anisotropy as illustrated in FIG. 4. In those cases the magnetization in the free layer can be rotated in only the center portion sensors because the magnetic moments in two end ranges of the free layers are fixed by the shape anisotropy. This design can also be incorporated in the future spin-tunneling GMR head designs.

What is claimed is:

1. A magnetoresistive sensor comprising:
    a plurality of spin valve sensor layers; wherein the plurality of spin valve layers comprises:
        a free magnetic layer having opposing planar first and second surfaces;
        a first nonmagnetic layer having a planar first surface contacting the first surface of the free magnetic layer and a planar second surface contacting a planar first surface of a first pinned magnetic layer;
        a second nonmagnetic layer having a first planar surface contacting the second surface of the free magnetic layer and a planar second surface contacting a planar first surface of a second pinned magnetic layer;
    an air bearing surface perpendicular to a first edge region common to the plurality of spin valve sensor layers; and
    a non-planar surface perpendicular to a second edge region common to the plurality of spin valve sensor layers and opposite the air bearing surface.

2. The sensor of claim 1 wherein the non-planar surface further comprises a substantially concave channel.

3. The sensor of claim 1 wherein the non-planar surface further comprises a substantially plateau region.

4. The sensor of claim 1 wherein the non-planar surface is formed within an electromagnetic active portion of the magnetoresistive sensor.

5. The sensor of claim 1 wherein the non-planar surface is formed in the direction of a magnetic medium's motion.

6. The sensor of claim 1 wherein the height of the spin valve sensor layers is less than 0.65 µm.

7. The sensor of claim 1 wherein the air bearing surface is substantially parallel to a magnetically recorded surface.

8. A method for producing a magnetoresistive sensor comprising:

forming a plurality of spin valve sensor layers, the plurality of spin valve layers comprising:

a free magnetic layer having opposing planar first and second surfaces;

a first nonmagnetic layer having a planar first surface contacting the first surface of the free magnetic layer and a planar second surface contacting a planar first surface of a first pinned magnetic layer;

a second nonmagnetic layer having a first planar surface contacting the second surface of the free magnetic layer and a planar second surface contacting a planar first surface of a second pinned magnetic layer;

forming an air bearing surface perpendicular to a first edge region of a plurality of spin valve sensor layers, and forming a non-planar surface perpendicular to a second edge region of the plurality of spin valve sensor layers and opposite the air bearing surface.

9. The method of claim 8 wherein the non-planar surface further comprises a substantially concave channel.

10. The method of claim 8 wherein the non-planar surface further comprises a substantially plateau region.

11. The method of claim 8 wherein the non-planar surface is formed within an electromagnetic active portion of the magnetoresistive sensor.

12. The method of claim 8 wherein the non-planar surface is formed in the direction of a magnetic medium's motion.

13. The method of claim 8 wherein height of the spin valve sensor layers is less than 0.5 µm.

14. The method of claim 8 wherein the air bearing surface is substantially parallel to a magnetically recorded surface.

15. A magnetoresistive sensor comprising:

a plurality of spin valve sensor layers, wherein the plurality of spin valve layers comprises:

a free magnetic layer having opposing planar first and second surfaces;

a first nonmagnetic layer having a planar first surface contacting the first surface of the free magnetic layer and a planar second surface contacting a planar first surface of a first pinned magnetic layer;

a second nonmagnetic layer having a first planar surface contacting the second surface of the free magnetic layer and a planar second surface contacting a planar first surface of a second pinned magnetic layer, and a non-uniform height sensor means for increasing magnetoresistive change in an applied magnetic field.

* * * * *